(12) United States Patent
Wu

(10) Patent No.: US 11,687,140 B2
(45) Date of Patent: Jun. 27, 2023

(54) BROADCAST CONTROL METHOD FOR FROZEN APPLICATIONS

(71) Applicant: ZTE CORPORATION, Shenzhen (CN)

(72) Inventor: Peng Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 77 days.

(21) Appl. No.: 17/434,615

(22) PCT Filed: Mar. 25, 2020

(86) PCT No.: PCT/CN2020/081108
§ 371 (c)(1),
(2) Date: Aug. 27, 2021

(87) PCT Pub. No.: WO2020/220868
PCT Pub. Date: Nov. 5, 2020

(65) Prior Publication Data
US 2022/0171448 A1    Jun. 2, 2022

(30) Foreign Application Priority Data

Apr. 30, 2019    (CN) .......................... 201910364460.5

(51) Int. Cl.
*G06F 1/32*    (2019.01)
*G06F 1/3209*    (2019.01)

(52) U.S. Cl.
CPC .............. *G06F 1/3209* (2013.01); *G06F 1/32* (2013.01)

(58) Field of Classification Search
CPC .......... G06F 1/32; G06F 1/3209; G06F 9/485; G06F 9/542; H04L 12/1886; H04L 12/18; Y02D 10/00

USPC ......................................................... 713/320
See application file for complete search history.

(56) References Cited

U.S. PATENT DOCUMENTS

| | | | | |
|---|---|---|---|---|
| 5,802,305 | A | * | 9/1998 | McKaughan ........... H04L 12/12 709/227 |
| 2017/0048661 | A1 | * | 2/2017 | Park ........................ H04W 4/70 |
| 2019/0108076 | A1 | | 4/2019 | Huang et al. |

FOREIGN PATENT DOCUMENTS

| CN | 104486788 A | 4/2015 |
|---|---|---|
| CN | 106250177 A | 12/2016 |
| CN | 106681822 A | 5/2017 |
| CN | 106844029 A | 6/2017 |
| CN | 107066320 A | 8/2017 |

(Continued)

OTHER PUBLICATIONS

International Searching Authority. International Search Report and Written Opinion for PCT Application No. PCT/CN2020/081108, dated Jun. 30, 2020, and translation, pp. 1-10.

(Continued)

*Primary Examiner* — Chun Cao
(74) *Attorney, Agent, or Firm* — Vivacqua Crane PLLC

(57) ABSTRACT

Provided are a broadcast control method, a terminal device and a non-transitory computer-readable storage medium. While received broadcast information is to be sent to a target frozen App, the target frozen App is temporarily unfrozen in response to determining that a temporary unfreezing condition for the target frozen App is met, and the broadcast information is sent to the temporarily unfrozen App; or otherwise, the broadcast information is directly discarded.

16 Claims, 3 Drawing Sheets

(56) References Cited

FOREIGN PATENT DOCUMENTS

| CN | 108055693 A | 5/2018 |
| CN | 109640384 A | 4/2019 |
| EP | 3418892 A1 | 12/2018 |
| WO | 2012177190 A1 | 12/2012 |
| WO | 2017166117 A1 | 10/2017 |
| WO | 2018058779 A1 | 4/2018 |

OTHER PUBLICATIONS

European Patent Office. Extended European Search Report for EP Application No. 20799132.4, dated Feb. 21, 2022, pp. 1-12.
International Searching Authority. International Search Report and Written Opinion for PCT Application No. PCT/CN2020/081108, dated Jun. 30, 2020, pp. 1-6.

\* cited by examiner

BROADCAST CONTROL METHOD FOR FROZEN APPLICATIONS

CROSS-REFERENCE TO RELATED APPLICATION

This application is a national stage filing under 35 U.S.C. § 371 of international application number PCT/CN2020/081108, filed Mar. 25, 2020, which claims priority to Chinese patent application No. 201910364460.5, filed Apr. 30, 2019. The contents of these applications are incorporated herein by reference in their entirety.

TECHNICAL FIELD

Embodiments of the present disclosure relate to, but not limited to, the field of communication, and in particular to, but not limited to, a broadcast control method, a terminal device and a non-transitory computer-readable storage medium.

BACKGROUND

Freezing technology is a method mainly used to restrain Apps from consuming system resources of intelligent terminals mainly by disabling the consumption of resources of Central Processing Unit (CPU) and resources of sensors, the Global Positioning System (GPS), memory and other peripherals. It can effectively reduce power consumption and prolong battery life. While power consumption is still the shortcoming of various intelligent terminals, the applications of the freezing technology in these intelligent terminals may be particularly important.

A frozen App in a terminal no longer consumes resources, but the App itself is still alive, and its service logic connections to other modules in the terminal system still exist, where under a broadcast mode, which is a common and important connection mode in the terminal system, other modules in the system can communicate with the frozen App in a broadcasting manner, for example, through broadcasting information. In related technologies, to maximize the power saving effect for a freezing process, all broadcast information to be sent to the frozen Apps is directly intercepted. Although this operation may maximize the power saving effect for the freezing process, the frozen Apps cannot receive any broadcasted information, the services and even life cycle of the Apps is frozen, resulting in poor user experience and satisfaction.

SUMMARY

Embodiments of the present disclosure provide a broadcast control method, a terminal device and a computer-readable storage medium, intended to at least partially solve the technical problem that the processing mode of intercepting all broadcast information to be sent to frozen Apps in related technologies may impair services and even life cycle of the Apps and consequently lead to poor user experience and satisfaction.

To at least partially solve the above technical problem, according to an embodiment of the present disclosure a broadcast control method is provided. The method may include:
  receiving broadcast information to be sent to a target frozen App; and
  temporarily unfreezing the target frozen App in response to determining that a temporary unfreezing condition for the target frozen App is met, and sending the broadcast information to the temporarily unfrozen App; or in response to determining that the temporary unfreezing condition for the target frozen App is not met, discarding the broadcast information.

To at least solve partially the above problem, according to an embodiment of the present disclosure a terminal device is further provided. the terminal device includes a processor, a memory and a communication bus, the communication bus is configured to connect the processor to the memory, and the processor is configured to execute computer programs stored in the memory to implement the broadcast control method described above.

To at least partially solve the above problem, according to an embodiment of the present disclosure a non-transitory computer-readable storage medium is further provided. The non-transitory computer-readable storage medium stores one or more computer programs which, when executed by one or more processors, cause the one or more processors to implement the broadcast control method described above.

Other features and corresponding beneficial effects of the present disclosure will be described below in the specification, and it should be appreciated that at least some of the beneficial effects will become apparent from the description of the present disclosure.

DETAILED DESCRIPTION

To make the objective, technical schemes and advantages of the present disclosure clearer, embodiments of present disclosure will be further described in detail below with reference to the accompanying drawings by embodiments. It should be appreciated that, the embodiments described herein are not intended for limiting the present disclosure but merely for elaborating the present disclosure.

It can be understood by those having ordinary skill in the art that, in the following embodiments of the present disclosure, the terminal device may be mobile phones, tablet computers, laptops, palmtops, smart TVs, mobile Internet devices, wearable devices, or any other terminals or devices that can carry out the App processing method of the present disclosure, which are not limited by the present disclosure.

Embodiment I

In view of the processing approaches of related technologies where all broadcast information to be sent to frozen Apps is intercepted, a broadcast control method is provided according to this embodiment, which does not directly discard all broadcast information to be sent to a target frozen App but unfreezes the target frozen App in case that a temporary unfreezing condition is currently met, to allow the App to process its broadcast information as normal, or discards the broadcast information in case that the condition is not met. Therefore, a more reasonable way to control the broadcast information for the frozen App is provided, to achieve a balance between power saving and normal broadcast information processing, whereby the user experience and satisfaction is improved.

Figure 1:
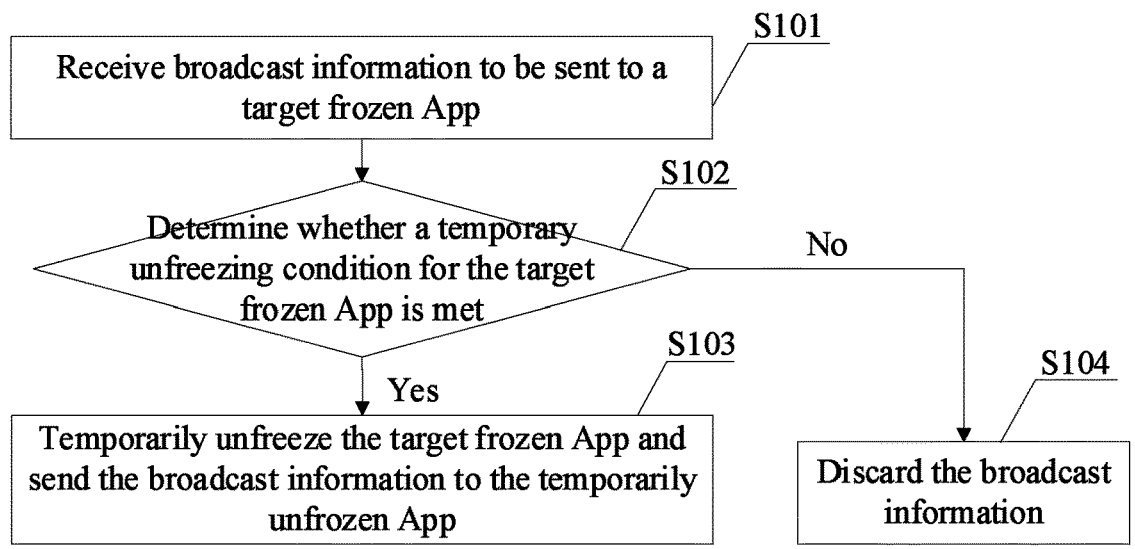
FIG. 1 is a flowchart of a broadcast control method according to embodiment I of the present disclosure.

For ease of understanding, this embodiment will be described below by taking a process flow of the broadcast control method shown in FIG. 1 as an example. Referring to FIG. 1, the method includes following steps S102 to S104.

At step S101, broadcast information to be sent to a target frozen App is received.

In the embodiment, a freezing condition for determining whether to freeze an App in service may be flexibly configured. For example, the freezing condition may include, but not limited to, following conditions:
 the App is switched to background from foreground;
 when the App is running, a terminal device on which the App is running, is switched from a screen-on state to a screen-off state; and
 a freezing instruction is received, which may be sent for the App running in background or for the App running in foreground, and can be flexibly configured according to application scenarios.

It should be appreciated that, in the embodiment any freezing method can be used to freeze the App as long as the method can disable the self-start function of the App in the frozen state for reducing power consumption, while allowing the App to continue running by unfreezing the App, without restart the App, in case of a need to be used.

In the embodiment, the broadcast information in step S101 may be broadcast information derived from a network side, and may also be broadcast information generated by another local module of the terminal device and sent to the frozen App. It should be appreciated that, the specific format and content of the broadcast information in this embodiment can be flexibly configured as the case may be.

At step S102, it is determined whether a temporary unfreezing condition for the target frozen App is met, if yes, the method proceeds to S103, otherwise proceeds to S104.

In the embodiment, the temporary unfreezing condition for the frozen App may be flexibly set up according to specific requirements and/or application scenarios. For example, the condition may be set up according to at least one of the characteristics of the broadcast information, the characteristics of the frozen App, and the state of the terminal device having the frozen App installed on.

In an embodiment, in case of setting up the temporary unfreezing condition according to the characteristics of the broadcast information, whether the condition for the App is met may be determined by, but not limited to, at least one of the type of the broadcast information (the system broadcast information including e.g., but not limited to, system-defined broadcast information applied for use by a module in the system according to rules, or private broadcast information including, e.g., but not limited to, App-defined broadcast information applied for use within a relevant module), content of the broadcast information, transmission frequency of the broadcast information, reported statistic of the broadcast information, discarded statistic of the broadcast information, transmission time of the broadcast information, and information of an object to which the broadcast information is sent.

In another embodiment, in case of setting up the temporary unfreezing condition according to the characteristics of the frozen App, whether the condition for the App is met may be determined by, but not limited to, at least one of start permission of the App (e.g., whether self-start is enabled), security permission of the App, type of the App, functions carried out by the App, information of the App provider, and in the App blacklist or white list, in the terminal device.

In yet another embodiment, in case of setting up the temporary unfreezing condition according to the state of the terminal device on which the frozen App is installed, whether the condition for the App is met may be determined by, but not limited to, at least one of the current screen state of the terminal device (screen-on or screen-off), location of the terminal device, network connections of the terminal device, battery level of the terminal device, and type of the terminal device.

It should be appreciated that, in the above, the temporary unfreezing condition may be flexibly set up according to either a single factor or two or more factors in the above description. For ease of understanding, the embodiment will be described in more detail below with an example of setting the temporary unfreezing conditions. In the embodiment, the temporary unfreezing conditions include, but not limited to, at least one of following conditions.

Condition I: the received broadcast information is system broadcast information, and the target frozen App corresponding to the broadcast information is an App of which self-start function is enabled; the determination on whether the self-start of the App is enabled may be obtained from, for example, an install pack of the App.

Condition II: the received broadcast information is system broadcast information and not on a blacklist of system broadcast information; in the embodiment, the blacklist of system broadcast information may be configured and/or updated by at least one selected from a group consisting of a terminal provider, a service provider and a terminal device user, and may include at least one of:
 identification information of the broadcast information that is blacklisted, and
 a rule for determining whether certain system broadcast information is the broadcast information on the blacklist.

In an embodiment, whether broadcast information or a type of broadcast information falls into in a blacklist may be determined by at least one selected from a group consisting of transmission frequency, discarded statistic, complained statistic and role of the broadcast information, and usage habits of end users. The above mechanism may support automatic learning and updating by an automatic machine learning method and/or a manual updating method. For example, the blacklist of system broadcast information may be expanded through log analysis and summary or AI machine learning methods, in view of the role of the broadcast information, the transmission frequency of the broadcast information, and the number of receivers, i.e., the blacklist is dynamically upgraded and maintained.

Condition III: the received broadcast information is system broadcast information and not on the blacklist of system broadcast information, and the target frozen App is an App self-start disabled.

Condition IV: the received broadcast information is system broadcast information and on the blacklist of system broadcast information, and the target frozen App is an App self-start disabled and falls into a first set of App types.

In the embodiment, the Apps may be flexibly classified according to specific requirements. For example, the App may be classified based on the requirements for real-time data processing, or by functions carried out by the App, or by the type of the App provider, and so on. In the embodiment, the specific App types included in the first set of App types may be, but not limited to, configured and/or updated by at least one of the terminal provider, the service provider and the terminal user. In some examples, the App may also support automatic learning and updating by an automatic machine learning method and/or a manual updating method.

Condition V: the received broadcast information is private broadcast information and not on a blacklist of private broadcast information. In an example, the blacklist of private broadcast information may also be expanded through log analysis and summary or AI machine learning methods, in view of the role and transmission frequency of the broadcast information in the App, and the number of receivers, i.e., the blacklist dynamically is upgraded and maintained.

Condition VI: the received broadcast information is private broadcast information and on the blacklist of system broadcast information, and the target frozen App falls into a second set of App types.

It should be appreciated that, the blacklist of private broadcast information and the second set of App types in the embodiment may be set up by, but not limited to, the setting methods for the blacklist of system broadcast information and the first set of App types in the above description, which will not be repeated herein.

Furthermore, it should be appreciated that, the six conditions described above are merely examples for setting up the temporary unfreezing conditions, and those having ordinary skill in the art can make purposeful and flexible substitutions or combinations according to specific needs. For example, in some examples, the determination may be made together with the screen-on state of the terminal device. In this case, before determining whether a temporary unfreezing condition for the target frozen App is met, the method may further include:

discarding the broadcast information to be sent to the target frozen App in response to determining that the terminal device, on which the target frozen App is installed, is currently in a screen-off state; and determining whether the temporary unfreezing condition for the target frozen App is met based on (but no limited to) the conditions in the above examples in response to determining that the terminal device, on which the target frozen App is installed, is currently in a screen-on state.

At step S103, the target frozen App is temporarily unfrozen, and the broadcast information is sent to the temporarily unfrozen App.

In the embodiment, to facilitate subsequent management and traceability, a reason for temporary unfreezing may also be recorded based on the currently met temporary unfreezing condition when the determination to temporarily unfreeze the target frozen App is made. For example, the reason for unfreezing may be one of the conditions (e.g., the condition I or the condition II) in the above examples is met. At the same time, the broadcast information to be sent to the unfrozen App may also be recorded accordingly.

At step S104, the broadcast information is discarded.

In an embodiment, when the broadcast information is discarded, the reason for discarding may also be recorded for subsequent management and traceability. For example, according to the temporary unfreezing conditions in the above examples, the reason for discarding may be that the terminal device is in the screen-off state, and the system broadcast information is self-start disabled and on the blacklist of system broadcast information, and the like.

In the embodiment, to improve the power saving efficiency of the frozen App, after temporarily unfreezing the target frozen App, the method may further include: determining whether a refreezing condition for the temporarily unfrozen App is met, if yes, refreezing the temporarily unfrozen App, that is, dynamically freezing and unfreezing the App to find a reasonable balance between the power saving of the terminal device and the normal broadcast information processing of the App, thereby achieving a reasonable power saving effect without impairing the normal services of at least part of the Apps, improving the reasonability in power saving control of the terminal device, and consequently improving user experience and satisfaction.

For this purpose, in the embodiment, refreezing conditions may be set up for temporarily unfrozen Apps. In an embodiment, a single refreezing condition may be applied for various temporarily unfrozen Apps, or alternatively, different refreezing conditions may be applied for different types of Apps according to App type or other App characteristics. A specific method can be flexibly used according to user needs. For ease of understanding, this embodiment will be described below in more detail with an example of several refreezing conditions. In the embodiment, the refreezing conditions include, but not limited to, at least one of following conditions:

an unfreezing duration of the temporarily unfrozen App reaches a preset threshold, for example, 30 seconds, 1 minute, 1.5 minute, or 2 minutes;

the temporarily unfrozen App has currently completed its corresponding data processing, such as broadcast information processing; and no data is processed by the temporarily unfrozen App over a preset duration (such as 30 seconds, 1 minute, 1.5 minute, or 2 minutes).

In the embodiment, the refreezing conditions corresponding to different App types may be the same or different, and can be flexibly set up according to specific requirements and application scenarios.

In the embodiment, an App control method may further include unfreezing the target frozen App in response to monitored that a condition for ending the frozen state of a certain frozen App (including at least one of a currently frozen state and a temporarily unfrozen state) is triggered. Furthermore, it should be appreciated that, the condition for ending the frozen state in this embodiment may also be flexibly set up according to specific application scenarios. For example, the condition for ending the frozen state may include, but not limited to, at least one of followings:

the frozen App stops running;

the frozen App is switched to run in foreground; and the screen-on state of the terminal is detected for the frozen App that is frozen due to the screen-off state of the terminal device.

Resulting from above, the broadcast control method provided in the embodiment processes the broadcast information to be processed by dynamically freezing and unfreezing the App, prohibiting rerunning of the frozen App for prolonged battery life of the terminal device, and allowing the frozen App to resume service by directly unfreezing rather than restarting the App when needed. At the same time, at least one frozen App can be temporarily unfrozen and refrozen dynamically as the case may be, allowing the frozen App to be temporarily unfrozen for sending and receiving broadcast information as normal, thereby avoiding perceptible packet loss, network unreachability or push message loss on a server side, and consequently improving user experience and satisfaction.

In addition, from the above description it can be known that, according to the embodiment, the appropriate temporary unfreezing conditions and refreezing conditions can be set up from various aspects, achieving a flexible and reliable detection on the App unfreezing broadcast with a minimum impact on users, thereby ensuring not only the correctness of the App's functions and state, but also the reduction in occurrence of unnecessary temporary unfreezing caused by broadcasting, and keeping the frozen App in a frozen state as long as possible for power saving, consumption reduction and user experience improvement.

Embodiment II

For ease of understanding, this embodiment will be described below with an example of configuring temporary unfreezing conditions. In the embodiment, the screen state of a terminal system is detected and monitored for distinguished overall strategies. In the screen-off state, the broadcast information for all frozen Apps can be directly filtered out, i.e., the broadcast information for all frozen Apps can be directly discarded. In the screen-on state, it needs to determine whether the current temporary unfreezing condition is met.

In an embodiment, the temporary unfreezing conditions may include followings:

the received broadcast information is system broadcast information, and the target frozen App corresponding to the broadcast information is an App for which self-start is enabled;

the received broadcast information is system broadcast information and not on the blacklist of system broadcast information, and the target frozen App is an App for which self-start is disabled;

the received broadcast information is system broadcast information and on the blacklist of system broadcast information, and the target frozen App is an App for which self-start is disabled and falls into a first set of App types;

the received broadcast information is private broadcast information and not on a blacklist of private broadcast information; and the received broadcast information is private broadcast information and on the blacklist of system broadcast information, and the target frozen App falls into a second set of App types.

Figure 2:
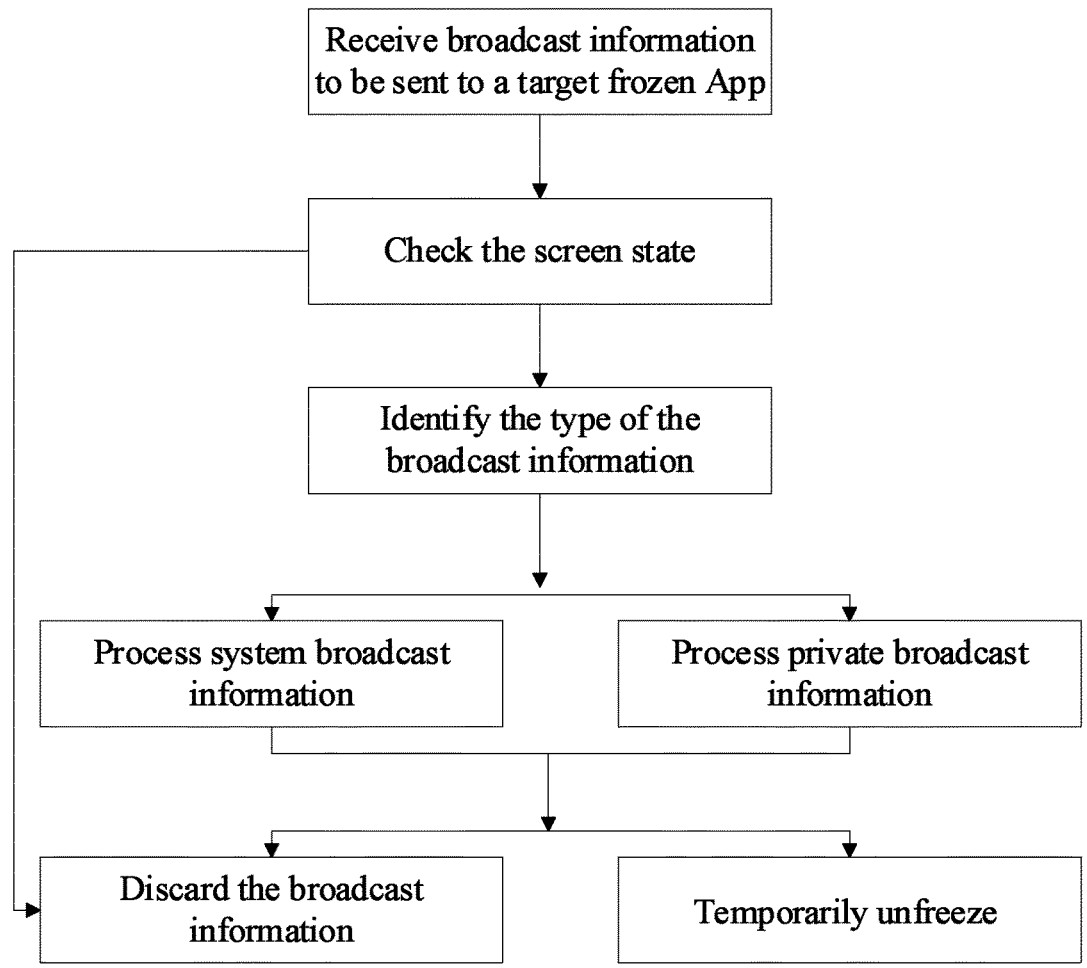
FIG. 2 is a logic diagram for processing broadcast information according to embodiment II of the present disclosure.
Figure 3:
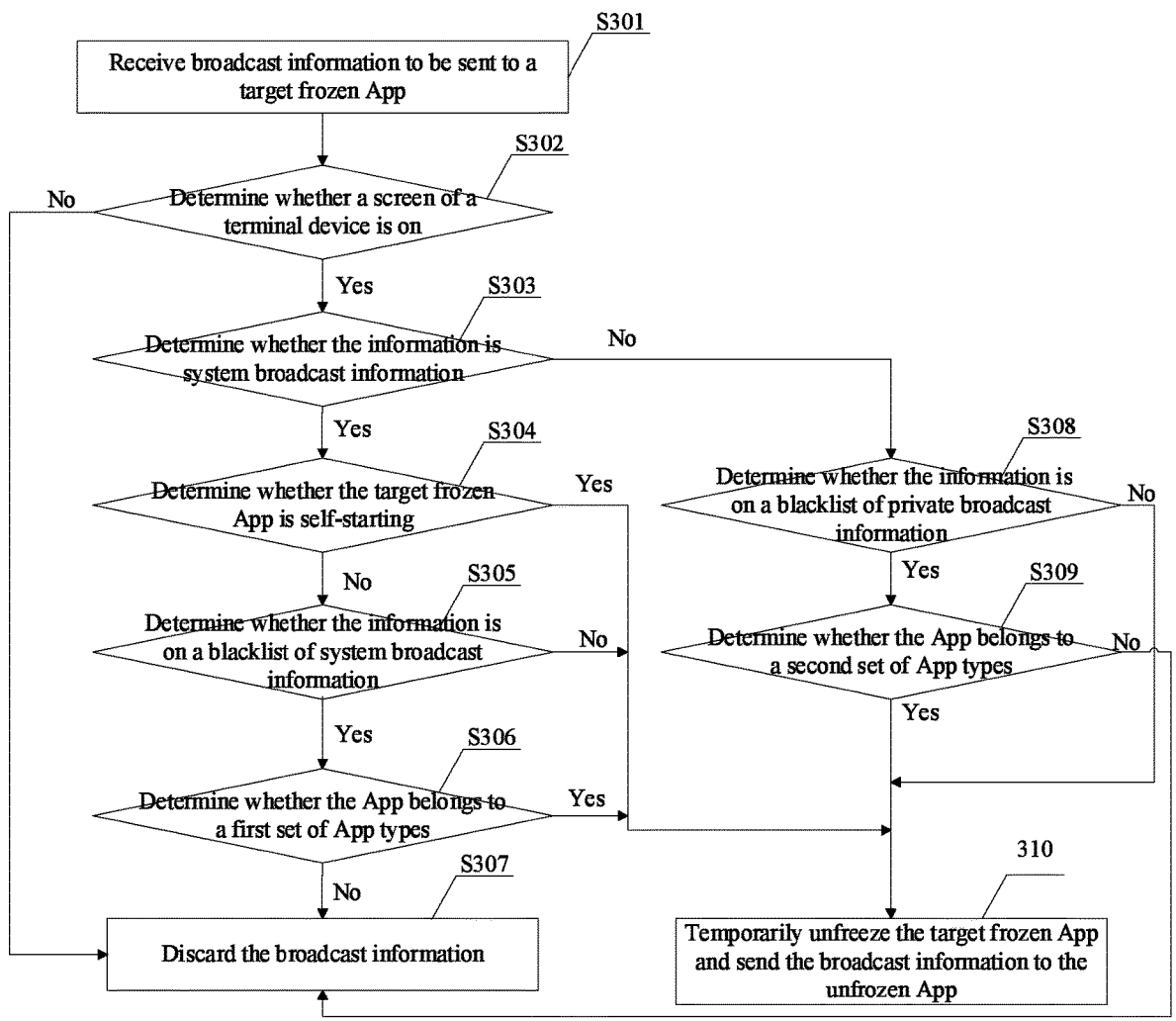
FIG. 3 is a flowchart of processing the broadcast information according to embodiment II of the present disclosure.

Referring to FIG. 2, in the embodiment, the processing logic after receiving the broadcast information to be sent to the frozen App includes: checking the screen state after receiving the broadcast information to be sent to the target frozen App, directly proceeding to the step of discarding the broadcast information in case of a screen-off state; determining whether the broadcast information is system broadcast information or private broadcast information in case of a screen-on state, proceeding to the step of processing the system broadcast information in case of the system broadcast information, and proceeding to the step of processing the private broadcast information in case of the private broadcast information; unfreezing the App if it is finally determined that there is a need to unfreeze; or, discarding the broadcast information. The processing flow is shown in FIG. 3, including steps S301 to S310.

According to the embodiment, an App freezing broadcast control method is provided for controlling the broadcast unfreezing process for frozen Apps, referring to the flowchart shown.

At step S301, it is detected that the target App to which the broadcast information is to be sent is currently a target frozen App in a frozen state.

At step S302, it is determined whether the terminal is currently in a screen-on state, if yes, proceed to S303, otherwise proceed to S307.

At step S303, the current broadcast information is parsed to determine whether the broadcast information is system broadcast information, if yes, proceed to S304, otherwise proceed to S308.

At step S304, it is determined whether the target frozen App corresponding to the broadcast information is self-start enabled (for example, the determination is based on, but not limited to, App priority), if yes, proceed to S310, otherwise proceed to S305.

At step S305, it is determined whether the broadcast information is on the blacklist of system broadcast information, if yes, proceed to S306, otherwise proceed to S310.

At step S306, it is determined whether the target frozen App corresponding to the broadcast information falls into a first set of App types, if yes, proceed to S310, otherwise proceed to S307.

At step S307, the broadcast information is discarded, and a reason for discarding is recorded.

At step S308, it is determined whether the broadcast information is on the blacklist of private broadcast information, if yes, proceed to S309, otherwise proceed to S310.

At step S309, it is determined whether the target frozen App corresponding to the broadcast information falls into a second set of App types, if yes, proceed to S310, otherwise proceed to S307.

At step S310, a temporary unfreezing request is issued to the target frozen App to unfreeze the target frozen App, the broadcast information is sent to the unfrozen App, and the temporary unfreezing reason and related data are recorded for system troubleshooting at the same time.

It can be seen that, the broadcast information control method provided in the embodiment can set up corresponding temporary unfreezing conditions and re-freezing conditions from various aspects, allowing flexible and reliable detection on the App unfreezing broadcast with a minimal impact on users' perception, thereby ensuring not only the correctness of the App's functions and states, but also the reduction of unnecessary temporary unfreezing caused by broadcasting, and keeping the frozen Apps in a frozen state as long as possible, for saving power, reducing consumption and improving user experience.

Embodiment III

Figure 4:
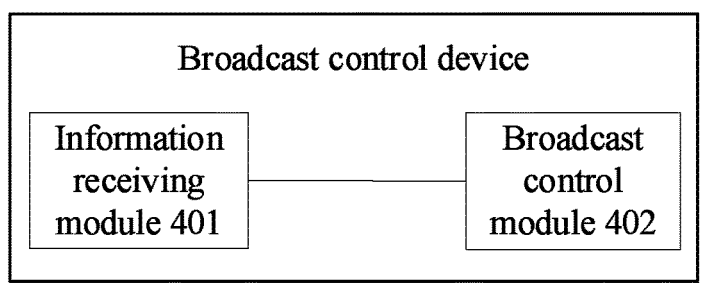
FIG. 4 is a structural diagram of a broadcast control device according to embodiment III of the present disclosure.

According to the embodiment, a broadcast control device is provided, which may be disposed in a terminal device, as shown in FIG. 4, and includes an information receiving module 401 and a broadcast control module 402.

The information receiving module 401 is configured to receive broadcast information to be sent to a target frozen App. In this embodiment, the broadcast information may be broadcast information from a network side, and may also be broadcast information generated by other local modules of the terminal and sent to the frozen App. It should be appreciated that, the specific format and content of the broadcast information in the embodiment can be flexibly configured as needed.

The broadcast control module 402 is configured to temporarily unfreeze the target frozen App when it is determined that a temporary unfreezing condition for the target frozen App is met, and send the broadcast information to the temporarily unfrozen App; or, discard the broadcast information.

In the embodiment, the temporary unfreezing condition of the frozen App can be flexibly configured according to specific requirements and/or application scenarios. For example, the condition can be set according to at least one of the characteristics of the broadcast information, the characteristics of the frozen App, and the state of the terminal with the frozen App. Examples of setting conditions are shown in the above embodiments and will not be repeated herein.

In an embodiment, the broadcast control module 402 may include:

a screen state check module configured to check whether a screen of the terminal is in an off or on state;

a broadcast type identification module configured to identify whether the broadcast information belongs to system broadcast information or private broadcast information, where methods used for identification may include, but not limited to, the methods described in the above embodiments, which will not be repeated herein;

a system broadcast processing module configured to process the system broadcast information by the methods described in the above embodiments, which will not be repeated herein;

a private broadcast processing module configured to process the private broadcast information by the methods described in the above embodiments, which will not be repeated herein;

a filtering module configured to discard broadcast information and record a reason for discarding; and a temporary unfreezing module configured to unfreeze the target frozen App to allow the unfrozen target frozen App to process the broadcast information. Detailed processes for App unfreezing and broadcast information processing will not be repeated herein.

Embodiment IV

Figure 5:
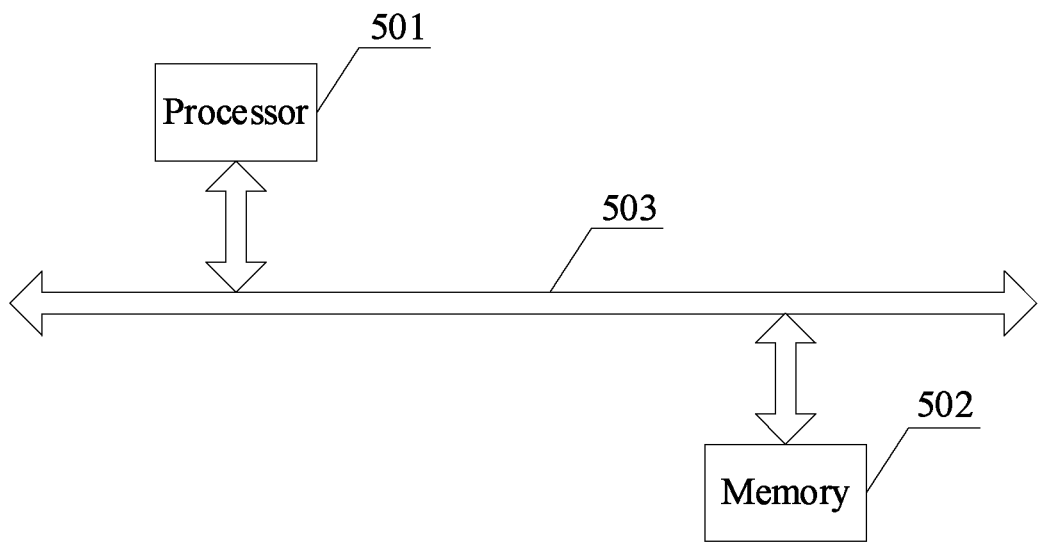
FIG. 5 is a structural diagram of a terminal device according to embodiment IV of the present disclosure.
Figure 6:
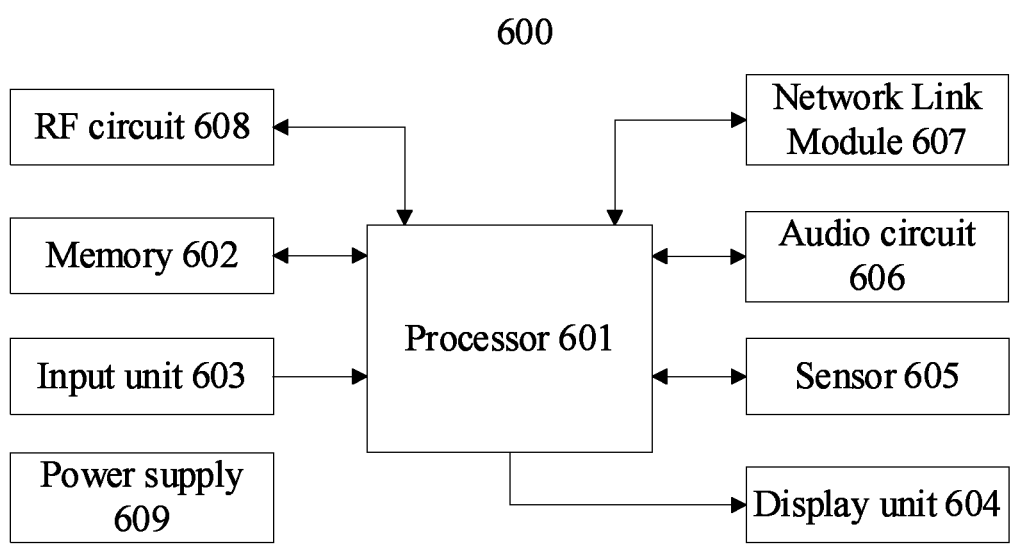
FIG. 6 is a structural diagram of another terminal device according to embodiment IV of the present disclosure.

In the embodiment, a terminal device is provided, which may include various mobile terminals or non-mobile terminals. Referring to FIG. 5, the terminal device includes a processor 501, a memory 502 and a communication bus 503.

The communication bus 503 is configured to connect the processor 501 to the memory 502.

The processor 501 is configured to execute computer programs stored in the memory to carry out the broadcast control method described in the above embodiments. The memory 502 herein may include an internal memory provided in the terminal, and exclude a memory provided in a terminal component separable from the terminal device. In an embodiment, the memory may include the memory provided in the terminal component separatable from the terminal as needed.

In the embodiment, the terminal device shown in FIG. 5 may be mobile phones, tablet computers, laptops, palmtops, smart TVs, Mobile Internet Devices, wearable devices, or any other terminal devices or devices that can carry out the App processing method of the present disclosure. The embodiment will be described below by taking a specific structure of a terminal device as an example. According to the embodiment of the present disclosure, the terminal device 600 includes an RF circuit 608, a memory 602 including one or more computer readable storage media, an input unit 603, a display unit 604, a sensor 605, an audio circuit 606, a Network Link Module (NLM) 607 (e.g., a WIFI module), one or more processors 601, and a power supply 609. Those having ordinary skill in the art can understand that the above structure does not constitute a limitation on the terminal device, and may include more or fewer components than those listed. The RF circuit 608 may be configured to receive and send communication signals, receive information from a base station, and then send the information to the processor 601 for processing. The memory 602 is configured to store software programs (including but not limited to the above computer programs) and modules, and the processor 601 performs various functions and data processing by running the software programs or modules in the memory 602. The input unit 603 may be configured to receive digital or character information input, and may include various input devices, such as touch screen input and other input devices. The input unit 603 also converts all kinds of input information into computer instructions and sends such instructions to the processor 601, and may also receive and execute commands from the processor 601. The display unit 604 is configured to display information input by a user or information provided by the terminal device to the user and various graphical user interfaces on the terminal device. The terminal device 600 also includes at least one sensor, such as an optical sensor, a motion sensor, etc. The terminal 600 may also include components such as the audio circuit 606, the NLM 607, and the power supply 609.

According to the embodiment, a non-transitory computer-readable storage medium is further provided, including volatile or nonvolatile, removable or non-removable media implemented in any method or technology for storing information, such as computer-readable instructions, data structures, computer program modules or other data. The computer readable storage medium includes, but not limited to, RAM (Random Access Memory), ROM (Read-Only Memory), EEPROM (Electrically erasable programmable read-only memory), flash memory or other memory technologies, CD-ROM (Compact Disc Read-Only Memory), digital versatile disc (DVD) or other optical disc memory, cartridge, tape, disk memory or other magnetic memory devices, or any other medium configured to store desired information and be accessed by a computer.

In the embodiment, the non-transitory computer readable storage medium may be configured to store one or more computer programs which, when executed by one or more processors, cause the one or more processors to implement the steps of the broadcast control method described in the above embodiments.

In the embodiment, a computer program (or computer software) is further provided, which can be distributed on a computer readable medium and executable by a computable device to carry out the steps of the broadcast control method described in the above embodiments. Moreover, in another embodiment, at least one step shown or described may be performed in an order different from that described in the above embodiments.

In the embodiment, a computer program product is further provided, including a computer readable device which stores the computer program described above. In this embodiment, the computer readable device may include the computer readable storage medium described above.

According to the broadcast control method, the terminal device and the non-transitory computer readable storage medium provided in the embodiments of the present disclosure, when the broadcast information which is received is to be sent to a target frozen App, in response to determining that a temporary unfreezing condition for the target frozen App is met, the target frozen App can be temporarily unfrozen and the broadcast information is sent to the temporarily unfrozen App; otherwise, the broadcast information is directly discarded. That is to say, according to the embodiments of the present disclosure, the broadcast information to be sent to a target frozen App is not discarded directly, but is sent to the target frozen App which is unfrozen when a temporarily unfreezing condition is currently met, the temporarily unfrozen App receives the broadcast information and process it as normal. Alternatively, the broadcast information will be discarded in case that the temporary unfreezing condition is not met. Therefore, it is more reasonable to control the broadcast information of the frozen App, to achieve a balance between power saving and normal processing of broadcast information, and improve user experience and satisfaction.

Therefore, those having ordinary skill in the art should understand that all or some of the steps, systems and functional modules/units in the devices disclosed above may be implemented as software (which may be implemented by computer program codes executable by a computing device), firmware, hardware and appropriate combinations thereof. In the implementations by hardware, the division among the functional modules/units mentioned in the above description does not necessarily correspond to the division for physical components. For example, a physical component may have a plurality of functions, or a function or step may be performed cooperatively by several physical components. Some or all of the physical components may be implemented as software executed by a processor, such as CPU, a digital signal processor or a microprocessor, or as hardware, or as an integrated circuit, such as an App specific integrated circuit.

Furthermore, it is well known to those having ordinary skill in the art that communication media typically contain computer-readable instructions, data structures, computer program modules, or other data in modulated data signals such as carrier waves or other transmission mechanisms, and may include any information delivery media. Therefore, the present disclosure is not limited to any particular combinations of hardware and software.

The above are further detailed descriptions of the embodiments of the present disclosure, and cannot be deemed as limitations to the specific embodiments of the present disclosure. For those having ordinary skill in the art to which the present disclosure belongs, various derivations or substitutions may also be made without departing from the concept of the present disclosure, all of which should be regarded as falling into the scope of the present disclosure.

The invention claimed is:

1. A broadcast control method, comprising:
    receiving broadcast information to be sent to a target frozen App; and
    in response to determining that a temporary unfreezing condition for the target frozen App is met, temporarily unfreezing the target frozen App and sending the broadcast information to the temporarily unfrozen App; or in response to determining that the temporary unfreezing condition for the target frozen App is not met, discarding the broadcast information;
    wherein the temporary unfreezing condition comprises at least one of following conditions:
        the received broadcast information is system broadcast information, and the target frozen App is an App which is self-start enabled;
        the received broadcast information is system broadcast information and not on a blacklist of system broadcast information;
        the received broadcast information is system broadcast information and not on the blacklist of system broadcast information, and the target frozen App is an App which is self-start disabled;
        the received broadcast information is system broadcast information and on the blacklist of system broadcast information, and the target frozen App is an App which is self-start disabled and has a type falling into a first set of App types;
        the received broadcast information is private broadcast information and not on a blacklist of private broadcast information; and
        the received broadcast information is private broadcast information and on the blacklist of system broadcast information, and the target frozen App has a type falling into a second set of App types.

2. The broadcast control method of claim 1, further comprising at least one of following:
    recording a reason for temporary unfreezing based on the currently met temporary unfreezing condition in response to temporarily unfreezing the target frozen App; and
    recording a reason for discarding the broadcast information.

3. The broadcast control method of claim 1, before determining whether a temporary unfreezing condition for the target frozen App is met, further comprising:
    discarding the broadcast information in response to determining that a terminal device with the target frozen App is currently in a screen-off state; and
    further determining whether the temporary unfreezing condition for the target frozen App is met in response to determining that the terminal with the target frozen App is currently in a screen-on state.

4. The broadcast control method of claim 1, after temporarily unfreezing the target frozen App, further comprising refreezing the temporarily unfrozen App in response to determining that a refreezing condition for the temporarily unfrozen App is met.

5. The method of claim 4, wherein the refreezing condition comprises at least one of following conditions:
    an unfreezing duration of the temporarily unfrozen App reaches a preset threshold;
    the temporarily unfrozen App has currently completed processing of the corresponding broadcast information; and
    no data is processed by the temporarily unfrozen App over a preset duration.

6. The broadcast control method of claim 1, further comprising:
    unfreezing the target frozen App in response to detecting that a condition for ending the frozen state of the target frozen App is triggered; and
    the condition for ending the frozen state of the target frozen App comprises at least one of following conditions:
        the target frozen App stops running;
        the target frozen App is switched to run in foreground; and
        a current screen-on state of the terminal device is detected, for the target frozen App which is frozen due to the screen-off state of the terminal device.

7. The broadcast control method of claim 1, before determining whether a temporary unfreezing condition for the target frozen App is met, further comprising:
discarding the broadcast information in response to determining that a terminal device with the target frozen App is currently in a screen-off state; and
further determining whether the temporary unfreezing condition for the target frozen App is met in response to determining that the terminal with the target frozen App is currently in a screen-on state.

8. The broadcast control method of claim 2, before determining whether a temporary unfreezing condition for the target frozen App is met, further comprising:
discarding the broadcast information in response to determining that a terminal device with the target frozen App is currently in a screen-off state; and
further determining whether the temporary unfreezing condition for the target frozen App is met in response to determining that the terminal with the target frozen App is currently in a screen-on state.

9. The broadcast control method of claim 1, after temporarily unfreezing the target frozen App, further comprising refreezing the temporarily unfrozen App in response to determining that a refreezing condition for the temporarily unfrozen App is met.

10. The broadcast control method of claim 2, after temporarily unfreezing the target frozen App, further comprising refreezing the temporarily unfrozen App in response to determining that a refreezing condition for the temporarily unfrozen App is met.

11. The method of claim 9, wherein the refreezing condition comprises at least one of following conditions:
an unfreezing duration of the temporarily unfrozen App reaches a preset threshold;
the temporarily unfrozen App has currently completed processing of the corresponding broadcast information; and
no data is processed by the temporarily unfrozen App over a preset duration.

12. The method of claim 10, wherein the refreezing condition comprises at least one of following conditions:
an unfreezing duration of the temporarily unfrozen App reaches a preset threshold;
the temporarily unfrozen App has currently completed processing of the corresponding broadcast information; and
no data is processed by the temporarily unfrozen App over a preset duration.

13. The broadcast control method of claim 1, further comprising:
unfreezing the target frozen App in response to detecting that a condition for ending the frozen state of the target frozen App is triggered; and
the condition for ending the frozen state of the target frozen App comprises at least one of following conditions:
the target frozen App stops running;
the target frozen App is switched to run in foreground; and
a current screen-on state of the terminal device is detected, for the target frozen App which is frozen due to the screen-off state of the terminal device.

14. The broadcast control method of claim 2, further comprising:
unfreezing the target frozen App in response to detecting that a condition for ending the frozen state of the target frozen App is triggered; and
the condition for ending the frozen state of the target frozen App comprises at least one of following conditions:
the target frozen App stops running;
the target frozen App is switched to run in foreground; and
a current screen-on state of the terminal device is detected, for the target frozen App which is frozen due to the screen-off state of the terminal device.

15. A terminal device, comprising a processor, a memory and a communication bus;
the communication bus is configured to connect the processor to the memory; and
the processor is configured to execute computer programs stored in the memory to perform a broadcast control method comprising:
receiving broadcast information to be sent to a target frozen App; and
in response to determining that a temporary unfreezing condition for the target frozen App is met, temporarily unfreezing the target frozen App and sending the broadcast information to the temporarily unfrozen App; or in response to determining that the temporary unfreezing condition for the target frozen App is not met, discarding the broadcast information;
wherein the temporary unfreezing condition comprises at least one of following conditions:
the received broadcast information is system broadcast information, and the target frozen App is an App which is self-start enabled;
the received broadcast information is system broadcast information and not on a blacklist of system broadcast information;
the received broadcast information is system broadcast information and not on the blacklist of system broadcast information, and the target frozen App is an App which is self-start disabled;
the received broadcast information is system broadcast information and on the blacklist of system broadcast information, and the target frozen App is an App which is self-start disabled and has a type falling into a first set of App types;
the received broadcast information is private broadcast information and not on a blacklist of private broadcast information; and
the received broadcast information is private broadcast information and on the blacklist of system broadcast information, and the target frozen App has a type falling into a second set of App types.

16. A non-transitory computer-readable storage medium storing one or more computer programs which, when executed by one or more processors, cause the one or more processors to perform a broadcast control method comprising:
receiving broadcast information to be sent to a target frozen App; and
in response to determining that a temporary unfreezing condition for the target frozen App is met, temporarily unfreezing the target frozen App and sending the broadcast information to the temporarily unfrozen App; or in response to determining that the temporary unfreezing condition for the target frozen App is not met, discarding the broadcast information;

wherein the temporary unfreezing condition comprises at least one of following conditions:

the received broadcast information is system broadcast information, and the target frozen App is an App which is self-start enabled;

the received broadcast information is system broadcast information and not on a blacklist of system broadcast information;

the received broadcast information is system broadcast information and not on the blacklist of system broadcast information, and the target frozen App is an App which is self-start disabled;

the received broadcast information is system broadcast information and on the blacklist of system broadcast information, and the target frozen App is an App which is self-start disabled and has a type falling into a first set of App types;

the received broadcast information is private broadcast information and not on a blacklist of private broadcast information; and the received broadcast information is private broadcast information and on the blacklist of system broadcast information, and the target frozen App has a type falling into a second set of App types.

* * * * *